Aug. 2, 1927.
E. K. BAKER
1,637,847
PLANETARY REDUCTION GEAR
Filed March 11, 1922
2 Sheets-Sheet 1
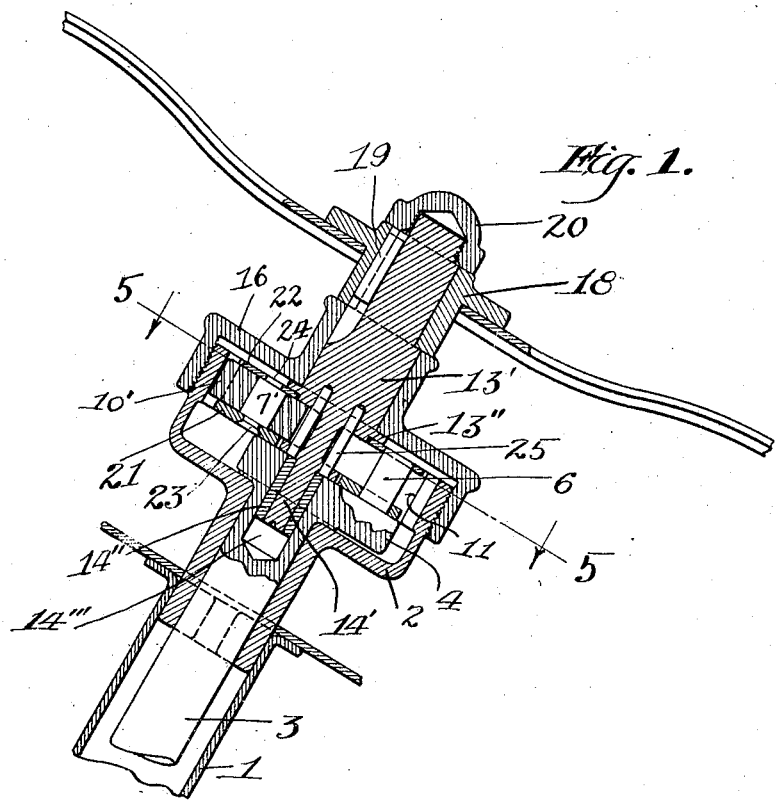
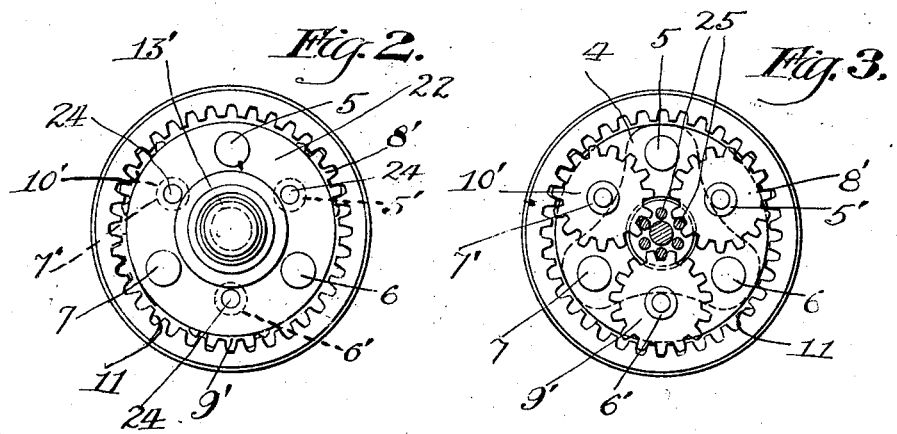
Witness:
Earl E. Howe
Inventor:
Eric K. Baker
by Arthur W. Nelson Atty.

Aug. 2, 1927.
E. K. BAKER
1,637,847
PLANETARY REDUCTION GEAR
Filed March 11, 1922    2 Sheets-Sheet 2
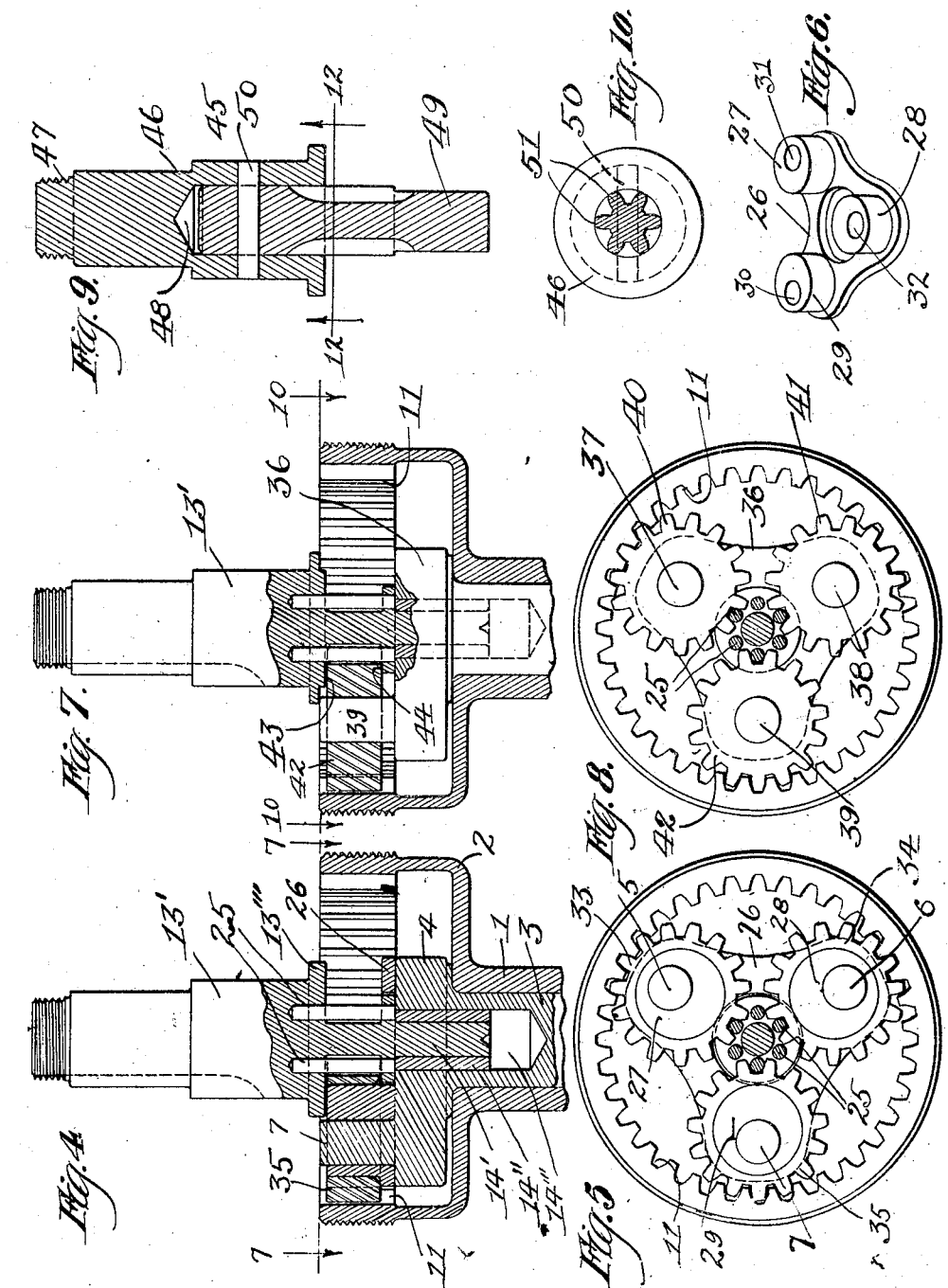

Patented Aug. 2, 1927.

1,637,847

UNITED STATES PATENT OFFICE.

ERLE K. BAKER, OF DETROIT, MICHIGAN, ASSIGNOR TO BAKER REDUCTION GEAR COMPANY, OF DETROIT, MICHIGAN, A CORPORATION OF MICHIGAN.

PLANETARY REDUCTION GEAR.

Application filed March 11, 1922. Serial No. 542,889.

My invention relates generally to improvements in planetary reduction gears, but relates more particularly to reduction gearing as applied to the steering equipment of automobiles.

Steering equipment for automobile use in order to meet satisfactorily the peculiar conditions that obtain with respect to its manufacture and use, should be of simple and durable construction; it should be of such construction that it can be purchased at low cost; it should be so constructed that a reduction of approximately six to one can be obtained in order that easy steering may be assured; and at the same time, it should be of compact construction so that it may fit properly in the limited space generally available for mechanism of this kind, and also to the end that a proper size relation of the parts, such as is highly desired in automobile practice, may be attained.

It is, therefore, an object of my invention to provide a planetary gear construction which shall be better adapted to meet the requirements of automobile practice.

It is also an object of my invention to provide a planetary reduction gear construction, which shall be adapted to interfit with and serve as a replacement for planetary reduction gears, of a type now in extensive use; and in this relation it is also a special object of my invention to provide a construction of such form that it may be quickly and easily installed, and which when so installed shall not alter the exterior appearance of the steering equipment, but which shall serve to decrease the burden of steering the automobile and thereby enhance the safety and comfort of the operator and others.

My invention consists generally in a device of the form, arrangement, construction, and co-action of the parts, whereby the above named objects, together with others that will appear hereinafter are attainable; and my invention will be more readily understood by reference to the accompanying drawings which illustrate what I consider, at the present time, to be the preferred embodiment thereof.

In said drawings:

Fig. 1 is a view through a planetary reduction gear and illustrates my improved construction.

Fig. 2 is a plan view of a construction shown in Fig. 1, except that the cap for the gear housing has been removed, better to disclose the interior construction.

Fig. 3 is a detail view substantially on the line 5—5 of Fig. 1.

Fig. 4 is a view partly in section and partly in elevation of a modified construction embodying my invention.

Fig. 5 is a view substantially along the line 7—7 of Fig. 4.

Fig. 6 is a perspective view of a spider member used in that form of my invention shown in Figs. 4 and 5.

Fig. 7 is a view similar to Fig. 4, but illustrating a still further modification of my invention.

Fig. 8 is a view substantially on the line 10—10 of Fig. 7.

Fig. 9 is a sectional detail view illustrating a modified construction of one of the gear elements, and Fig. 10 is a sectional view substantially on the line 12—12 of Fig. 9.

The most prominent example of a planetary reduction gear construction as employed in automobile practice is found in the Ford automobile. Because of its extensive use and its well known characteristics, I shall describe my invention with especial reference to such use. While in some of its aspects my invention has been especially designed for the Ford car, in other of its aspects it is of wider application. The description with reference to the Ford automobile should, therefore, be considered by way of illustration and not by way of limitation, except where so limited in the claims.

I shall now describe my novel construction wherewith a much greater gear reduction is obtained without increasing the size or space required to accommodate the gear mechanism and, at the same time, in such a way that the requisite strength is embodied in the teeth of the spur gears. The steering column is marked 1, housing 2, post 3, cap or cover 16, steering wheel hub 18, as well as steering wheel as a whole, and the assembly nut 20, all of which are identical in construction with the standard Ford construction. The upper portion 4 of the steering post likewise contains the three upstanding bosses 5, 6 and 7, but the spur gears are not mounted thereon. Instead, I have provided three spur gears 8′, 9′, and 10′, which are considerably larger than the spur gears of the standard Ford construction, which larger spur gears are mounted upon shafts or studs 5', 6', and 7', and thus are in engagement with the internal spur gear 11 that is formed as a part of the housing 2. The studs 5', 6' and 7', as well as serving as journals for the spur gears, also serve to assemble a lower ring or washer 21 and an upper ring or washer 22, being riveted to the lower washer or ring 21, as indicated at 23, and having an upper reduced portion 24 that enters openings provided therefor in the upper ring 22.

The post 13' is of unique construction and instead of having gear teeth cut therein, it is drilled to receive plurality of drill rods or other suitable metallic rods 25, which are so spaced as to coact, as gear teeth, with the respective spur gears 8', 9', and 10'. The lowermost end portion of the post 13' is reduced, as indicated at 14', so that it accommodates a sleeve 14'' which restores the external diameter to the diameter of the opening 14''', that is provided in the steering post 3. It will be understood that the reduced portion 14' is necessary to permit assembly of the drill rods 25. The post 13' is also provided with an annular collar portion 13'' which is interposed between the inner face of the cover 16 and the ring 22. Thus, the housing cover serves to hold the parts in desired assembled relation.

By this novel construction the central gear may be made at low cost and even with the enlarged spur gears 8', 9', and 10', is of sufficient strength to withstand severe service conditions. As will also be readily observed, the exterior of the housing and other parts remains unchanged, both as to size, shape and position so that no disturbance of the relative sizes of the parts is occasioned. Furthermore the gear reduction is twice that obtainable by the standard Ford construction, with the result that a car equipped with mechanism of my construction is much easier to steer. Again, obstructions encountered by the front wheels do not react so violently upon the steering wheel. This is a great help in promoting safety. It should also be observed that my novel construction can be very easily and quickly installed in planetary gear constructions of the Ford type without the necessity of any particular amount of skill, and without the necessity of special tools of any kind. It thus becomes suitable, if desired, as a replacement for such planetary reduction gears.

In Figs. 4, 5 and 6, I have illustrated a construction quite similar to that shown in Figs. 1, 2 and 3, but modified in some respects. In this form of my invention, I provide a somewhat triangularly shaped plate, which is formed with three cylindrical boss portions 27, 28, and 29. The boss portions 27, 28 and 29, in turn, are provided with bores 30, 31 and 32, respectively, of a size to accommodate the bosses, 5, 6, and 7, respectively of the portion 4 of the steering post, 3.

It will be observed that the holes in the bosses 27, 28, and 29 are eccentric with respect to the vertical axes of the bosses, or conversely that the bosses are eccentric with respect to the vertical axes of the openings or bores 30, 31, and 32. The bosses 27, 28 and 29, therefore, provide proper journals for the spur gears 33, 34 and 35, which are considerably larger than the gears 8, 9 and 10, that are mounted upon the bosses 5, 6, and 7 of the construction shown in Figs. 1 and 2. Thus the spur gears 33, 34 and 35 are in engagement with the rods 25 carried by the post 13'. The construction shown in Figs. 4 and 5 also differs from the construction shown in Figs. 1, 2 and 3, in that the plates 21 and 22 are omitted, the plate 26 taking the place of the lower plate 21, and the upper plate 22, being entirely omitted. Likewise the flange 13'' of the post 13' is not undercut as shown in Fig. 1, but is of uniform thickness and thus serves to hold the parts in proper co-relation. The assembly is completed by means of the cover and other parts, as already described with reference to Figs. 1 and 2, so that no further description need here be given.

Those forms of my invention thus far described are such as are probably most suitable for replacement purposes, in that they require the changing of the fewest number of parts of the automobile steering equipment. For new machines or for use where the replacement of the smallest number of parts is not essential I may use the construction shown in Figs. 7 and 8. In such an event the upper portion 36 of the steering post is provided with boss portions 37, 38 and 39 which are closer to the center of the steering post and are thus in a position to form journals for the spur gears 40, 41 and 42 respectively. The post 13' is quite similar in construction to that shown in Fig. 1, but it will be observed that the spur gears 40, 41 and 42 are prevented from undue movement axially of the bosses 37, 38, and 39, by virtue of their entry between the shoulder portions 43 and 44 of the post portion 13'. The remaining parts are or may be of the construction already described, so that no further description need be given.

In Figs. 9 and 10 I have illustrated a modified construction that may be used for the purpose of the post member 13', but which because of its different structural characteristics, bears as a whole the reference character 45. As will be observed, it is composed of an upper portion 46 which is adapted to receive the hub of the steering wheel and with a threaded portion 47 for the accommodation of the nut 20, shown in other views of the drawings. It is likewise provided with a central bore or opening 48 for the accommodation of a substantial cylindrically shaped member 49 which is preferably driven into place and then secured as by means of a cross pin or key 50. The member 49, in turn, is cut or machined to provide a plurality of gear teeth 51 so that the device 49 may serve as a central spur gear of the planetary system. By making the member 49 of a separate piece it can be made of a metal best adapted to withstand the strains imposed in service and at the same time it can be machined more easily and at less expense.

From the foregoing, it will be clear that the objects and purposes of my invention are obtainable by the constructions herein shown and described, but inasmuch as this disclosure will suggest to others, modified constructions whereby the substantial objects and purposes of my invention may be attained, I do not wish to be limited to the construction or constructions herein shown and described, except only as may be necessary by limitations in the hereunto appended claims.

I claim:—

1. A device of the class described embodying therein a steering post, a plurality of lugs carried thereby, a pinion rotatively mounted on each lug with its axis spaced from the axis of its associated lug, a non-rotatable internal gear and a rotatable external gear arranged coaxially therewith, both of said gears being in mesh with all of said pinions.

2. A device of the class described embodying therein a steering post, a plurality of lugs carried thereby, a pinion rotatively mounted on each lug with its axis spaced inwardly with respect to the axis of its associated lug, a non-rotatable internal gear, a rotatable external gear arranged coaxially therewith, both of said gears being in mesh with all of said pinions and a steering wheel operatively connected to said external gear for rotating the same.

3. A device of the class described embodying therein, an internal gear, an axially disposed external gear, a steering post, including a plate like portion, a plurality of arcuately spaced lugs on said plate like portion, and pinions carried by said lugs with their axes disposed off center with respect to said lugs and meshing with said external and said internal gears respectively.

4. A device of the class described embodying therein, an internal gear, an axially disposed external gear, a steering post, including a plate like portion, a plurality of arcuately spaced lugs on said plate like portion, a cylindrical boss portion mounted on each lug and disposed with its axis offset inwardly from the axis of the associated boss and a pinion journalled on each boss and meshing with said external and said internal gears respectively.

5. A device of the class described embodying therein, an internal gear, an axially disposed external gear, a steering post, including a plate like portion, a plurality of arcuately spaced lugs on said plate like portion, a cylindrical bearing member eccentrically mounted on each lug, and a pinion journalled on each bearing member and meshing with said external and said internal gears respectively.

In testimony whereof, I have hereunto set my hand, this 31st day of January, 1922.

ERLE K. BAKER.